(12) United States Patent
Weaver

(10) Patent No.: US 7,065,631 B2
(45) Date of Patent: Jun. 20, 2006

(54) SOFTWARE CONTROLLABLE REGISTER MAP

(75) Inventor: David L. Weaver, Emerald Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 527 days.

(21) Appl. No.: 10/120,075

(22) Filed: Apr. 9, 2002

(65) Prior Publication Data

US 2003/0191924 A1  Oct. 9, 2003

(51) Int. Cl.
*G06F 9/38* (2006.01)

(52) U.S. Cl. ...................................................... 712/217
(58) Field of Classification Search ................... 712/217
See application file for complete search history.

(56) References Cited

U.S. PATENT DOCUMENTS

2003/0074545 A1 * 4/2003 Uhler .......................... 712/228

OTHER PUBLICATIONS

Yang et al., Latte: A Java VM Just–In–Time Compiler with Fast and Efficient Register Allocation, Proceedings of the International Conference on Parallel Architectures and Compilation Techniques, IEEE, Oct. 12–16, 1999, pp. 128–138.*
David L. Weaver and Tom Germond, *The Sparc Architecture Manual*, Version 9, Prentice Hall, 9, 5,–21, 29–60, 87–129, 247–282 (1994).

* cited by examiner

*Primary Examiner*—William M. Treat
(74) *Attorney, Agent, or Firm*—Martine Penilla & Gencarella, LLP

(57) ABSTRACT

Virtual registers are mapped to architectural or physical registers according to a register map that is configurable with software. In one embodiment, only privileged software can configure the register map. In another embodiment, a portion of the register map is configurable with non-privileged software, and another portion is only configurable with privileged software. In yet another embodiment the register map is fully configurable by user software. The configurable register map provides backwards compatibility to code written for hardware-defined register mapping, while allowing flexible approaches to register mapping in code generated for a processor architecture using a software controllable register map.

26 Claims, 5 Drawing Sheets

SOFTWARE CONTROLLABLE REGISTER MAP

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to methods and apparatus for computer register memory and more particularly to mapping registers.

Computer systems use many different types of memory for storing information. Magnetic disks, optical compact disk read-only memory ("CD-ROM"), electronic ROM, and random-access memory ("RAM") are a few examples of types of computer memory that are relatively inexpensive, in terms of the cost per bit, and capable of storing a relatively large amount of memory. However, computer systems typically have other types of memory that might not be apparent to a casual user.

A processor chip ("processor") might have memory integrated with the logic processor to enhance operational speed. For example, the processor chip might have one or more levels of cache memory and a register file. The register file is a set of registers that is integrated with the logic processor on the central processing unit ("CPU") section of the processor chip.

Generally, one level of memory is fed by another. For example, an application might call input that is loaded to the cache memory from the main memory (e.g. off-chip ROM or RAM), and then to the register file. Typically, each level provides faster access than the prior level, the fastest being the register files, which can work at the full internal processor speed. Unfortunately, this speed comes at a price.

Register memory has a relatively large "footprint" compared to main memory, for example, and consumes a relatively large amount of power, so the physical size of the register file is limited. Similarly, how an application can access registers is defined by the processor hardware, and usually results in a fixed relationship between registers. Processor register architectures become fixed when they are designed. This limits software to accessing a fixed number of registers in hardware. However, it is not only the number of registers that are fixed, but the methods of accessing the registers are also fixed. This contributes to an aging of the architecture over time.

This aging can arise from the evolution of software applications and how applications access registers. The growth of modular software, increasing call-chain depths, and decreasing function size are examples of how software has been changing. At the time a processor architecture is defined, certain assumptions are made about the size and number of the registers and how they will be used, such as how many bits in an instruction string will be used to identify a register address (i.e. the "register number"). Using an N-bit register number as a direct index to a register file limits software to accessing $2^N$ registers.

Various techniques, such as register windows, have been developed for accessing other numbers of registers, but these techniques often place adders or non-power-of-two modulo operations in the logic path for physical register index generation. This can create a critical timing path issue for future hardware implementations, or impose additional pipeline stage(s) on future hardware implementations. Similarly, register access methods that attempt to access other numbers of registers with an N-bit register number system by creating multiple register files (of up to $2^N$ registers each), for example, split integer and floating-point register files, typically require additional instruction encodings to address the different register files. Experimenting with other register models, for example to test compilers generating software to run on future hardware implementations, with a fixed set of registers and access methods can be inefficient and difficult. Similar problems or limitations can arise when simulating or emulating register models for other processor architectures, for example, when executing software generated for a "foreign" architecture. Fixed-size register windows have been used in the SPARC™ architecture and variable-size register windows have been used in the IA-64 architecture.

One microprocessor implemented a "frame pointer" register. A fixed block of general-purpose registers was stored in a block of memory starting at a location indicated by the frame pointer, instead of putting the block of registers on-chip. The frame pointer mapped all register references to a block of memory addresses. This was a degenerate case of a register map because the frame pointer contained only one entry, instead of a separate map entry for each register. The frame pointer technique partially addressed the problems of addressing a fixed number of registers in hardware and N-bit register numbers limiting software to $2^N$ registers, but left other problems unresolved. Unfortunately, a frame pointer technique would probably provide unacceptably poor performance in current microprocessors, where memory access is typically orders of magnitude slower than on-chip register access.

Other processor architectures, such as the scalable processor architecture ("SPARC"™) version 8 ("V8"), IA-64, IA-32, and 680X0, have addressed the problem of being limited to $2^N$ registers when using N-bit direct index register numbers by creating separate namespaces for different types of register, for example, integer/general purpose and floating-point name spaces. Given N-bit register number fields in instructions, more than one set of $2^N$ registers can be addressed by restricting register number fields in each instruction to only address one set of $2^N$ registers (i.e. only one register name space at a time). However, this approach still suffers from architecture aging, not allowing applications to optimize register access, and requiring additional instruction encodings to address all the register namespaces.

The hardware technique of register re-naming, as is typically used in out-of-order processor implementations, partially addresses the problems of addressing a fixed number of registers in hardware and N-bit register numbers limiting software to $2^N$ registers, but leaves other problems unresolved. Register re-naming is a hardware technique that is invisible to software and involves use of a register map. SPARC64™, PA-8000™, MIPS R10000™ and PENTIUM™ processors include examples of processors using hardware register re-naming.

In summary, most processor architectures have provided a fixed-size array of general-purpose registers, accessible by a single access method in instructions, namely, direct index into the register array. At least one architecture has added an additional rotating register method of accessing those registers. However, even using rotating registers leaves several problems unresolved.

BRIEF SUMMARY OF THE INVENTION

A processor architecture has a register map that is controllable with software. In one embodiment, the register map is controllable with user (application or non-privileged) software. In another embodiment, some or all of the register map is only controllable with privileged software, such as the operating system.

DETAILED DESCRIPTION OF THE INVENTION

I. Introduction

A register map that is programmable through software, rather than fixed in hardware, provides a flexible register architecture(s). The programmable register map can support various access methods and can accommodate new register organizations as software evolves. Compilers can experiment with new register organizations on existing hardware, and register-access methods can be optimized on a per-application basis. Similarly, a large physical register file can be utilized in a flexible manner and can focus on particular categories of performance needs, e.g. floating-point vs. JAVA™ execution.

II. An Exemplary Processor

Figure 1:
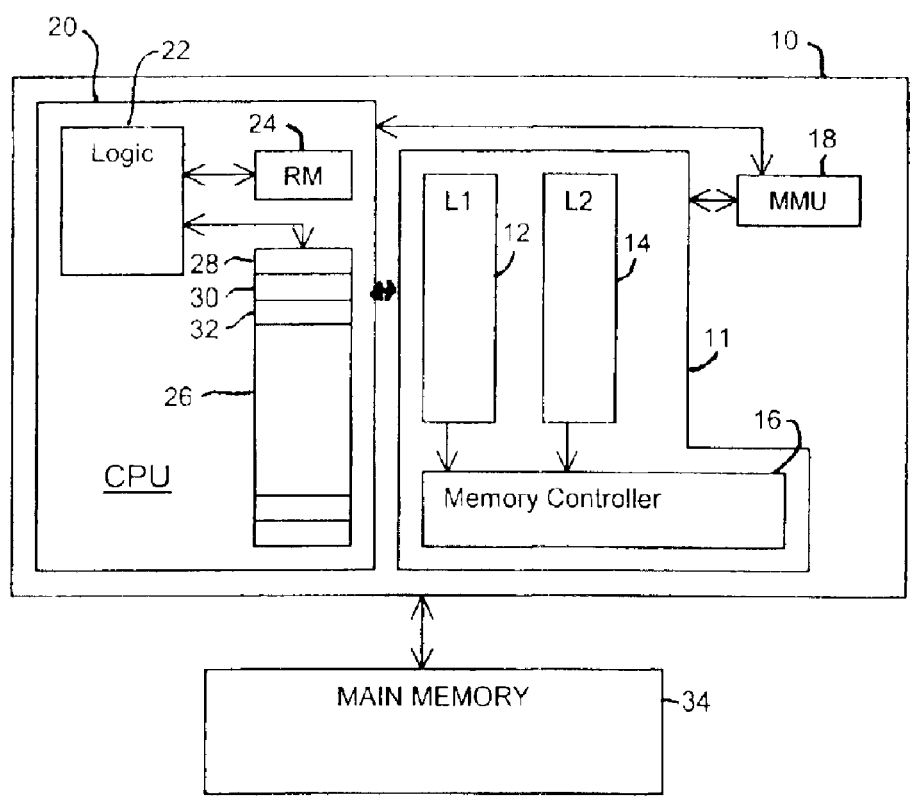
FIG. 1 is a simplified diagram of a processor chip according to an embodiment of the present invention.

FIG. 1 is a simplified functional block diagram of a processor chip ("chip") 10. The chip includes several functional blocks, such as level-one cache memory 12, level-two cache memory 14, a memory controller 16, a memory management unit ("MMU") 18, and a central processing unit ("CPU") 20. The cache memory and memory controller are parts of an on-chip memory subsystem 11. The CPU further includes a logic processor portion 22, a register map 24, and a register file 26. The register file is a set of registers 28, 30, 32 that store data and work at or near the full internal processor speed. While the registers provide high-speed data read/write capability, they typically consume more power and have a larger "footprint" on the chip, i.e. consume more area, than other types of memory.

The chip 10 interfaces with other functional blocks of a computer system, such as main memory 34. Main memory is generally slower but less expensive than registers. The optimum number of registers is not fixed for all applications, and it is generally desirable to limit the number of physical registers to the anticipated maximum number needed for an application. However, it is difficult to anticipate what will be needed as application software evolves. For example, application call depth is growing, breaking prior assumptions about optimal register architecture that led to register windows. While register windows appeared to be a good solution at the time, and are still desirable for many applications, in other instances an undesirable number of runtime register spills/fills to memory may occur. Similarly, application function size is shrinking, causing 16-register windows to be used inefficiently in some applications.

III. Register Window Emulation

Embodiments of the present invention allow a flexible approach to register mapping. In some instances, emulation of a prior hardware-based register mapping technique is achieved. Such emulation allows code written for a processor with hardware-based register mapping to run on later processors with software-controllable register mapping. Register windows are an example of a prior hardware-based register mapping technique that may be emulated with software-controllable register mapping.

Figure 2:
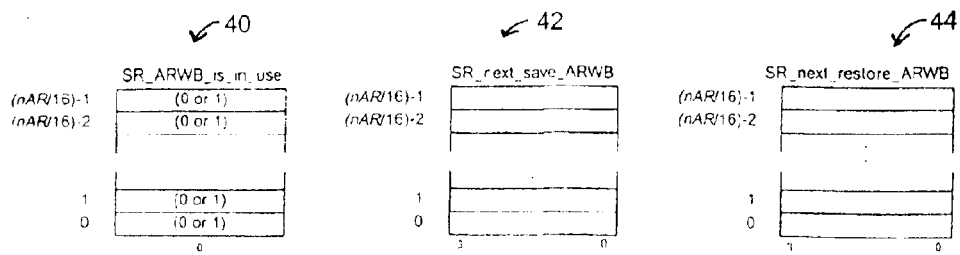
FIG. 2 is a simplified diagram illustrating register window emulation.
Figure 3A:
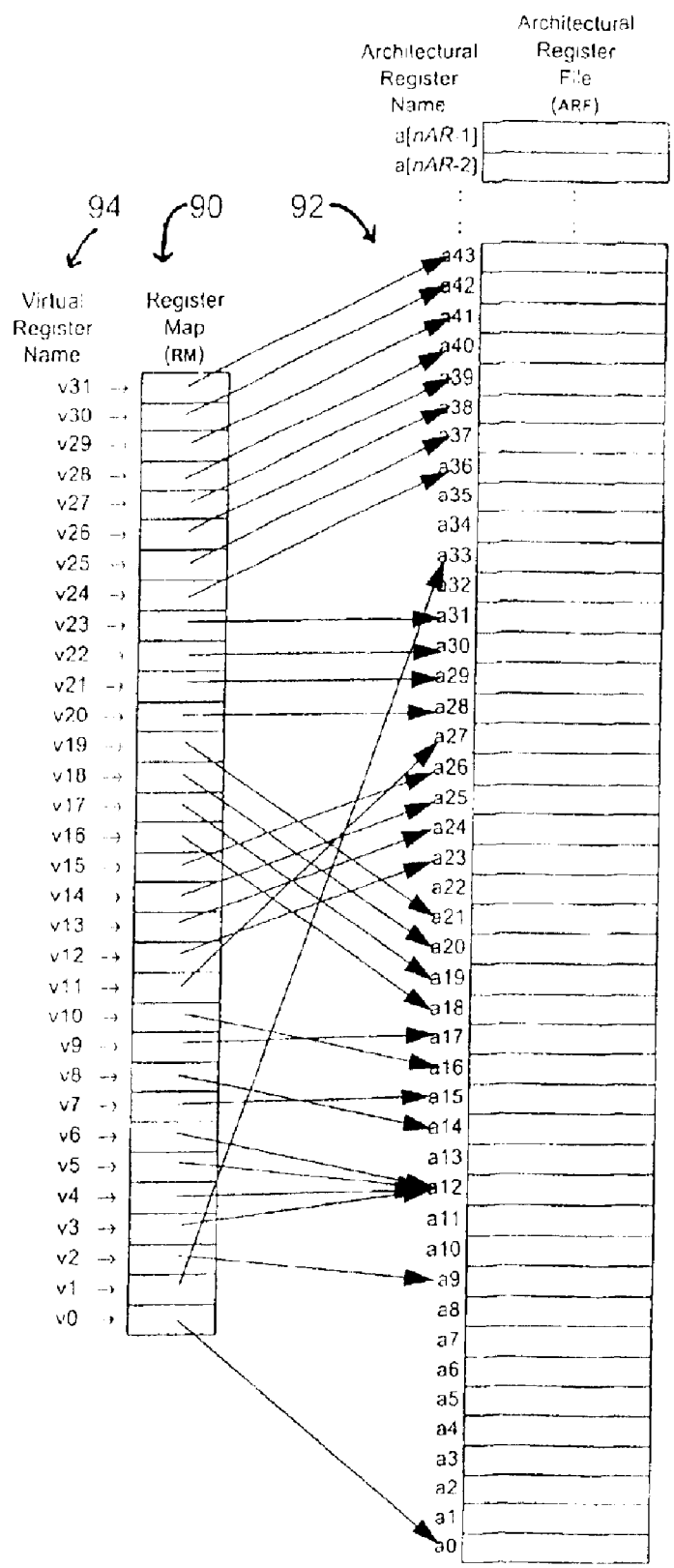
FIG. 3A is a simplified diagrammatic representation of a register map according to an embodiment of the present invention.
Figure 3B:
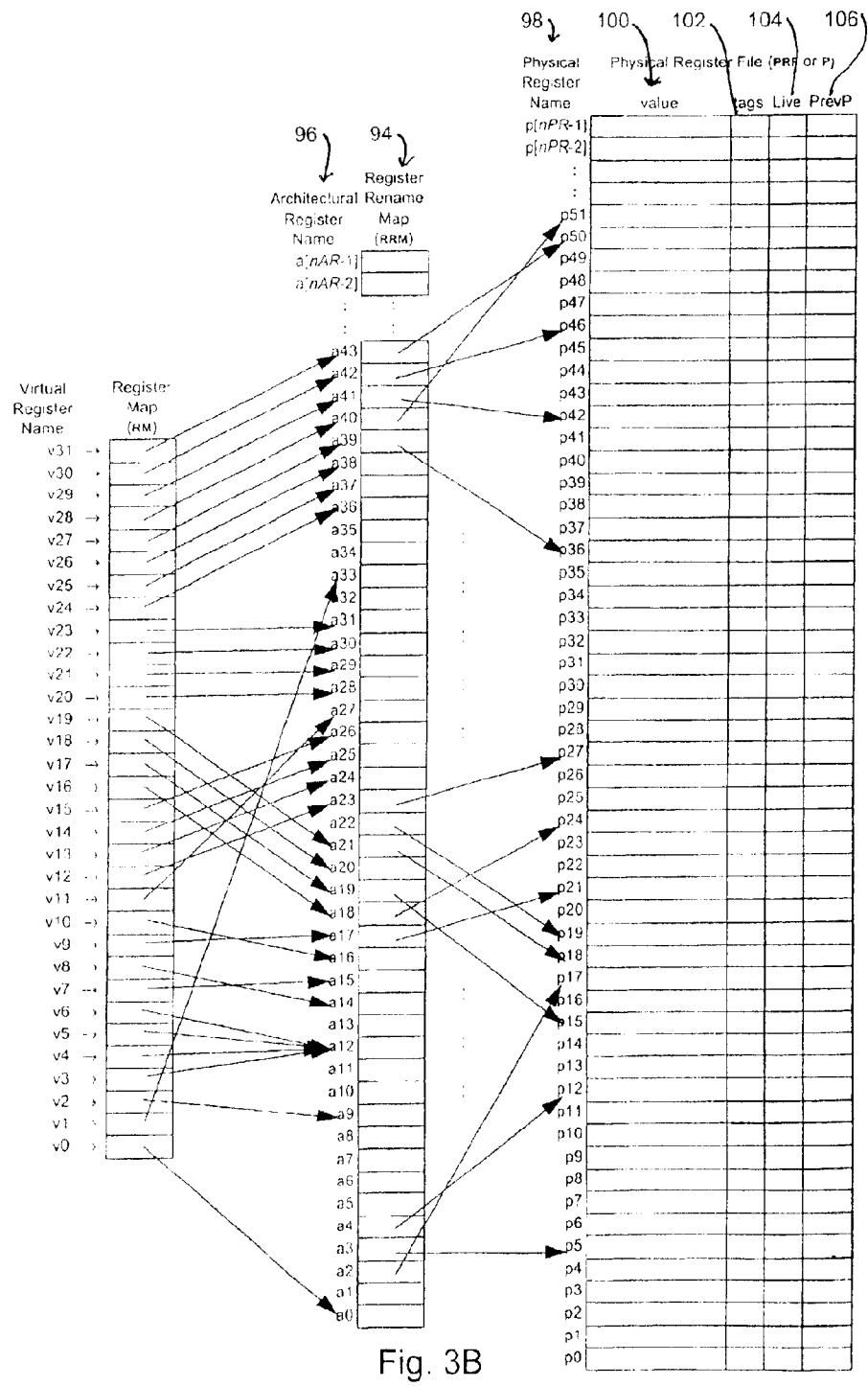
FIG. 3B is a simplified diagrammatic representation of a register map and register rename map according to another embodiment of the present invention.

To emulate register windows using the register configuration shown in FIG. 3A or 3B, the processor requires additional register window state information. An example of the additional state information is shown in FIG. 2. It is assumed in this example that:

256 architectural registers are implemented (nAR=256);

Each block ("window") of registers uses 16 contiguously-numbered registers, aligned on a 16-register boundary in the architectural register file; and When a processor is powered on (or an operating system is booted), the data structures SR_ARWB_is_in_use, SR_next_save_ARWB, and SR_next_restore_ARWB are initialized so that several blocks of 16 architectural registers are allocated to use for emulation of register windows; furthermore, that the SR_next_save_ARWB and SR_next_restore_ARWB arrays are initialized to arrange the allocated blocks of architectural registers in a circular list.

For each block of 16 architectural registers (referred to in this section as an "architectural register window block" or "ARWB"), the following information is kept:

a Boolean flag (bit) to indicate if the current block of 16 architectural registers contains active register window data (is "in use"), SR_ARWB_is_in_use, 40;

an index to the next block of 16 registers to use in the register-window "SAVE" direction, SR_next_save_ARWB, 42; and an index to the next block of 16 registers to use in the register-window "RESTORE" direction, SR_next_restore_ARWB, 44

Given the data structures in FIG. 2, the following pseudo-code illustrates one way a SAVE instruction could be implemented (emulated) on a processor with mapped registers:

```
#    va[] is the 32-entry Register Map array
#         (maps virtual register #s to architectural register #s)
#    ap[] is the 256-entry Architectural register map array
#         (maps architectural register #s to physical register #s)
#    p[] is array of physical registers
# Take SAVE operands from registers in the "old" window.
    if (instruction.i = 1)
    then result <-- p[ap[va[instruction.rs1]]]
+ p[ap[va[instruction.rs2]]];
    else result <-- p[ap[va[instruction.rs1]]] +
sign_extend(instruction.simm13);
    endif
    # Get the index to the next register window (block of
    # 16 architectural registers). Use the most significant 4 bits
    # of one of the "out" registers (8–15) to generate the index
    # into the SR_next_save_ARWB array.
    next_ARWB <-- SR_next_save_ARWB[va[8]<7:4>];
    # If the next register window (block of 16 architectural registers)
    # is already in use, save them to memory.
    if(SR_ARWB_is_in_use[next_ARWB] = 1)
    then    { spill the 16 architectural registers indicated by
            next_ARWB to a safe location in memory }
    endif
    # Update the 8 "in" register mapping from the old "out"
    register maps.
    # (if register windows are truly aligned on 16-register boundaries
    # in the architectural register file, then only the most significant
    # 4 bits of each "in" register mapping would need to be updated).
    va[31] <-- va[15];
    va[30] <-- va[14];
    va[29] <-- va[13];
    va[28] <-- va[12];
    va[27] <-- va[11];
    va[26] <-- va[10];
    va[25] <-- va[9];
    va[24] <-- va[8];
    # Update the most signficant 4 bits of "local" (16–23) and
    # "out" (8–15) register maps, from the starting register number
    # of the new block of architectural registers.
    va[23]<7:4> <-- next_ARWB;
    va[22]<7:4> <-- next_ARWB;
    va[21]<7:4> <-- next_ARWB;
    va[20]<7:4> <-- next_ARWB;
    va[19]<7:4> <-- next_ARWB;
    va[18]<7:4> <-- next_ARWB;
    va[17]<7:4> <-- next_ARWB;
    va[16]<7:4> <-- next_ARWB;
    va[15]<7:4> <-- next_ARWB;
    va[14]<7:4> <-- next_ARWB;
    va[13]<7:4> <-- next_ARWB;
    va[19]<7:4> <-- next_ARWB;
    va[12]<7:4> <-- next_ARWB;
    va[11]<7:4> <-- next_ARWB;
    va[10]<7:4> <-- next_ARWB;
    va[9]<7:4> <-- next_ARWB;
    va[8]<7:4> <-- next_ARWB;
    # Mark the "window block" as "in use"
    SR_ARWB_is_in_use[next_ARWB] <-- 1;
    # Set the result of the SAVE instruction in the destination
    # register of the SAVE (which is relative to the new window).
    if (instruction.rd != 0)
    then p[ap[va[instruction.rd]]] <-- result;
    endif
```

IV. Register Map Access Privileges

Note that software access privileges are not required to be uniform across all architectural registers. For example, some architectural registers may be read-only to, or not mappable at all by, nonprivileged software. In those cases, privileged software could make privileged information completely inaccessible to, accessible on a read-only basis to, or fully accessible (readable and writable) to nonprivileged software. One possible application of this is that privileged software could retain key privileged information in privileged architectural registers while nonprivileged software executes, without the potentially time-consuming operations (required in conventional register schemes) of saving and restoring that information to and from memory. Privileged software would only have to save the mapping to those registers, which itself could be saved in architectural register (s) and would not necessarily have to be saved in memory.

V. An Exemplary Register Map

FIG. 3A is a simplified diagrammatic representation of a register map ("RM") 90 according to an embodiment of the present invention. In this instance, a 32-bit entry map translates a 5-bit virtual register number into a reference to a register in a larger architectural register set 92, which in this instance is implemented as a flat file of nAR registers. Alternatively, a virtual register number with greater or fewer bits could be used, with appropriate modification of this example. Generally, the processor architecture would specify a minimum number of architectural registers (e.g. 64, 128, or other) that application software could depend on being present in any implementation of that version of processor architecture. An implementation of the processor architecture could implement more than the minimum number of architectural registers, but portable software would be compiled for only the minimum set. For example, system software such as the operating system, dynamically linked libraries, JIT-compiled code, and non-portable applications could be free to use more than the minimum set of registers. Application binaries might also be dynamically recompiled to use the full register set.

FIG. 3B illustrates the register map organization of FIG. 3A with an underlying implementation that provides register renaming. Register renaming in this example is inserted as a second-level map, the register rename map ("RRM") 94, that translates the architectural register numbers 0, . . . , nAR−1 96 into actual physical register numbers 0, . . . , nPR−1 98, where nPR≧nAR. The fields shown attached to each physical register 100 in FIG. 3B, i.e. tags 102, Live 104, and PrevP 106, are independent of the RRM and are shown only to illustrate a possible physical register file structure.

A TAGS field could carry information such as a "register dirty" bit (meaning that the register had been modified since the dirty bit was last set to zero), a speculative-load exception bit (which would indicated that an exception would have occurred on the last speculative load that used the register as a destination register), and/or register condition code tags for access by branch-on-register-value operations. Live and PrevP might be used in an implementation using a conservative register renaming strategy. During instruction decode, the virtual register numbers in an instruction are mapped to physical registers via the current register map and RRM, if any. While the instruction in the cache retains reference to the original virtual register numbers, the corresponding instruction in the processor's execution pipeline would refer to the physical register number, with no notion of the original virtual register number being retained in the pipeline.

VI. Register Map Cache

In an implementation of a two-level map (ref. FIG. 3B) with register renaming and short pipeline stages, there may be a concern that a two-level map could either create a critical path (lengthening cycle time) or add an extra stage to the pipeline. In an alternative embodiment, it might be possible to collapse register mapping and register renaming into a single map, but not without giving up the flexibility provided by allowing the register map to be manipulated by the user. However, in such an implementation it is possible to optimize hardware so that the privileged software model is a two-level register map, but only a single-level lookup is required while decoding each instruction.

One such optimization would be to create a 32-entry (generally $(\log_2(nAR))_{rup}$) register map cache ("RMC") in hardware, invisible to software, that contains the current physical register number to which each virtual register is currently mapped. As each instruction is decoded, the decoder would directly read the current virtual-to-physical translation for each virtual register number from the RMC, without doing a two-level lookup through the user register map and the RRM. The RMC, or the applicable portion of it, would be updated by hardware when the register map or RRM is updated.

VII. Exemplary Register Map

Figure 4A:
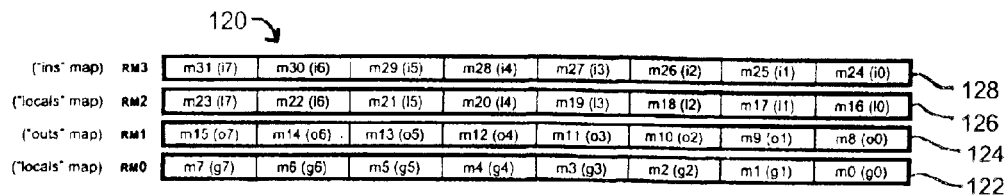
FIG. 4A is a simplified diagram illustrating an example of full register map access according to an embodiment of the present invention.

FIG. 4A is a simplified diagram illustrating one example of a full register map 120, accessed as four registers 122, 124, 126, 128, according to an embodiment of the present invention. Mapping registers RM0, RM1, RM2, and RM3 could be directly accessed in a processor architecture via register-map read/write instructions, via loads and stores to an alternate address space, or via ancillary state register read/write instructions, for example. The correspondence of mapping fields to the virtual registers they map are indicated by the number in the field name (e.g. m17 maps virtual register 17 to an architectural register).

A full register map in this example comprises 256 bits (shown in FIG. 4A and FIG. 4B, below, as four 64-bit values). However, all or part of the map can be changed with a single instruction; for example, register window SAVE or RESTORE instructions or an instruction with a 64-bit operand that modifies the entire register map with a source register granularity of four (that is, registers are mapped in blocks of four). Other such instructions might implement register rotation, stacking registers, or variable-size register windows.

Figure 4B:
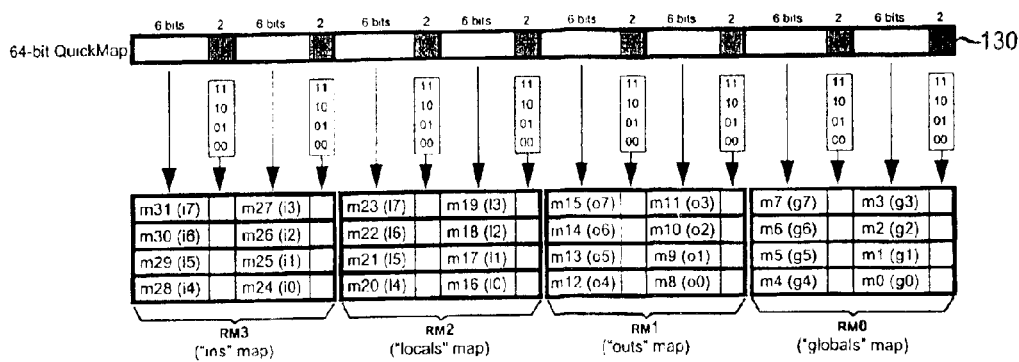
FIG. 4B is a simplified diagram illustrating the correspondence of a "quick map" value to a register map according to an embodiment of the present invention.

FIG. 4B is a simplified diagram illustrating the correspondence of a "quick map" value 130 to the register map of FIG. 4A. The quick map value is a 64-bit operand of an instruction that can modify the entire register map, in blocks of 4 registers. The quick map value is composed of eight 8-bit segments. Each 8-bit segment corresponds to a block of 4 virtual registers to be mapped. The position of each 8-bit segment in the quick map value determines which 4 virtual registers it will be used to modify; the least significant 8-bit segment corresponds to virtual registers 0 through 3, . . . , and the most significant 8-bit segment corresponds to virtual registers 28 through 31. Each 8-bit segment in the quick-map operand contains six bits to indicate a block of 4 architectural registers to which its corresponding 4 virtual registers should be mapped and two bits that are (in this example) unused. When the quick map instruction executes, the most significant six bits of each 8-bit register map value are copied from the most significant six bits of its corresponding 8-bit quick map segment and the least significant two bits are filled (in this example) with a copy of the least significant two bits of the virtual register number being mapped. Therefore, each block of four virtual registers is mapped to a block of four consecutively numbered architectural registers.

It is anticipated that the time required to do a virtual-to-architectural register number mapping when decoding each instruction will be less for register mapping according to at least some embodiments of the present invention than for traditional register windowing, such as in SPARC™ version 9 ("V9"). In SPARC™ V9, each register number reference is relative to the CWP, which in most implementations means that virtual register numbers must pass through at least an adder and a modulo operation, and possibly two of each, to translate a windowed register number to an architectural register number.

A processor architecture that includes register mapping could guarantee that a minimum number of architectural registers, e.g. 64, would be available in all its implementations. Portable software would map a maximum of 64 architectural registers. An implementation with a larger architectural register file could be built, up to the limits imposed by the width of a register map entry. Although portable software would not access the additional registers, kernel code, dynamically linked libraries, JIT-compiled, and dynamically compiled/translated code could use them.

In a further embodiment, the register map could be used to map virtual register numbers to registers on other processor cores, which might be on the same die or on a different die. Such accesses would probably incur longer latency than local accesses, and there would probably be a practical limit to the number of processor register sets that could be accessed.

VIII. Register Mapping for Privileged Code

Privileged ("kernel") code could have its own integer register map, or part of one, such as registers 1–7. An automatic switch to the kernel register map could occur upon a trap. The kernel register map might, for example, map virtual registers 1 through 7 into a different set of architectural registers than does the nonprivileged register map. The switch could implement a globals-per-trap-level feature that is desired by kernel software designers.

IX. Multiple Register Map(s)

On a processor architecture with multiple register namespaces, such as separate integer and floating-point register namespaces, floating-point registers may be mapped with a floating-point register map parallel to the integer register map. The floating-point and integer registers could map into the same or separate underlying architectural register files. If they map into the same architectural register file, then integer instructions could access floating-point values and vice versa. Even if integer and floating-point registers map to different architectural register files, it might be possible to allow each to map in parts of the other's register file. For example, the most significant bit of each register map entry might be used to select the register file. However, in such a case, access by an integer instruction to a floating-point register may incur additional cycles of access latency.

A separate map might be used for each precision of floating-point registers. That is, single-, double-, and quad-precision registers would all be mapped into the same architectural register file, but the different precisions of registers would no longer (at least in a SPARC™ implementation) need to be overlapped. In order to be compatible when executing SPARC™ V9 code, all floating-point registers could be mapped in the overlapping manner specified by SPARC™ V9. Similarly, a portion of the floating-point registers could be mapped to support unaligned FORTRAN doubles, or a portion of them could be overlapped for special code that takes advantage of the overlap.

X. Compatibility With Other Register Organization Techniques

Software-controllable register mapping, according to embodiments of the present invention, are compatible with several other register organization techniques, such as group mapping, individual mapping instructions, smaller fixed-size windows, variable-size register windows, register dirty bits, stack last-in-first-out registers, queued first-in-first-out registers, and N-bit register identifier techniques, where N can be adapted to a particular register architecture. Software-controllable register mapping allows use of various types of instructions to alter the mapping. In some instances, the processor can execute a sequence of instructions written for a different processor and register access method, or new map-altering instructions can be added.

XI. Method of Mapping Virtual to Architectural Registers

Figure 5A:
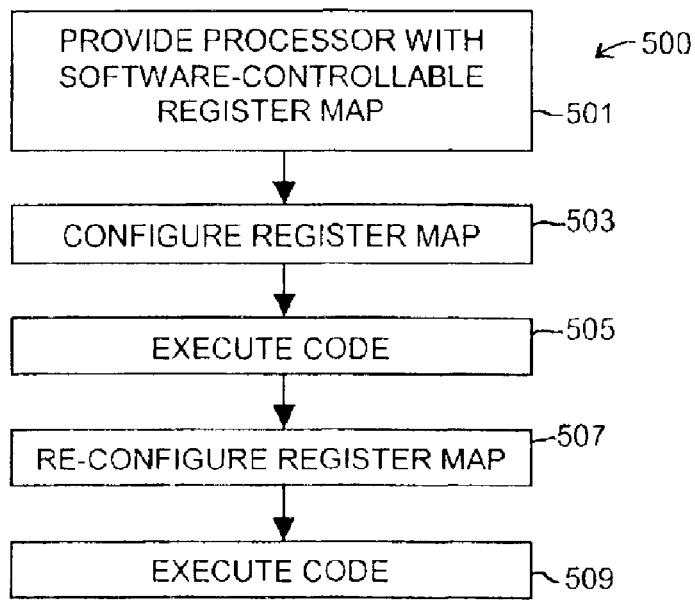
FIG. 5A is a simplified flow chart of a method according to an embodiment of the present invention.

FIG. 5A is a simplified flow chart of a method 500 of mapping virtual registers to architectural registers in a processor architecture according to a register access model. The register access model might have been originally defined for a processor with hardware-controlled register access and the mapping emulates the prior register access model. Alternatively, the register access model is defined for the software-controllable register map(s). In a further embodiment, the register access model defines a first mapping for a first portion of code, and defines a second mapping for a second portion of code. In other words, register mapping is done "on the fly" as code is being executed by the processor.

A processor with a software-controllable register map(s) is provided (step 501). The register map(s) is configured to map virtual registers in code, i.e. software such as non-privileged user code or privileged code, that is intended to be executed by the processor to access architectural registers of the processor (step 503). The code is then executed by the processor (step 505). In some instances, the code may be self-configuring, that is, it may contain computer-readable instructions for configuring the register map(s) before executing subsequent instructions.

In a further embodiment, after executing the code in step 505, the register map(s) is configured to a second configuration (mapping) of virtual registers to architectural registers (step 507) and a second block of code is executed by the processor (step 509). In other words, the register mapping is different between the execution of code in step 505 and the execution of code in step 509. Such re-configuring may occur more times, and may be structured as a loop back to a configuration step.

Instructions for performing the method illustrated in FIG. 5 can be stored on a computer-readable medium, such as magnetic disk, optical read-only memory ("ROM"), electronic ROM, randomly addressable memory ("RAM"), or a combination of types of memory. The instructions are typically loaded to the processor and hence to the register map(s) through various layers of memory, as discussed in association with FIG. 1.

Figure 5B:
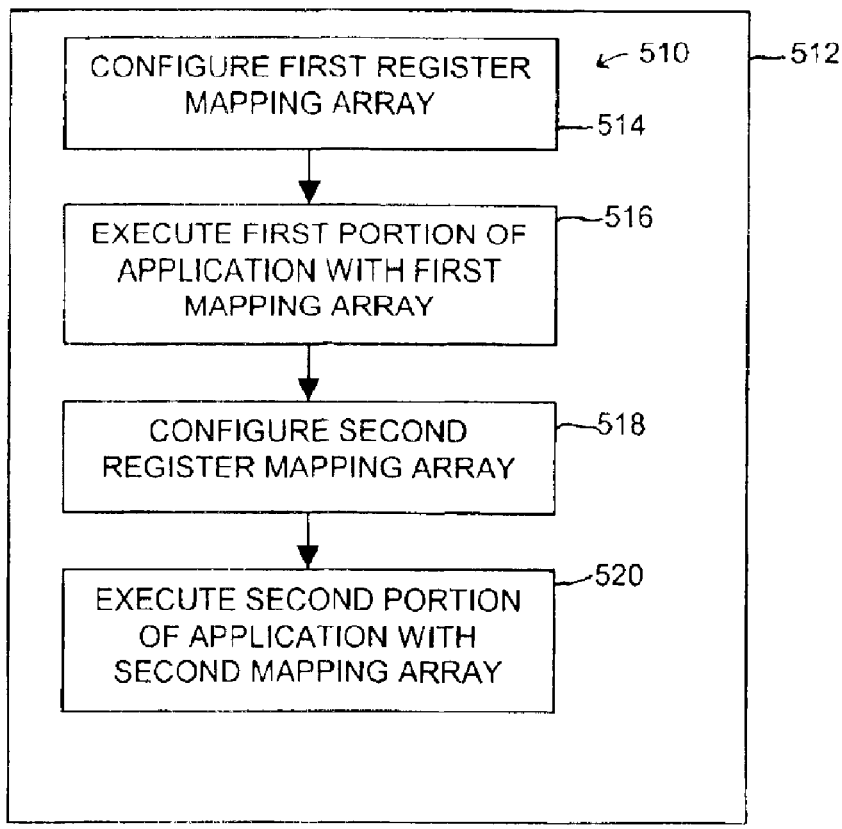
FIG. 5B is a simplified diagram of a computer-readable medium programmed with instructions according to an embodiment of the present invention.

FIG. 5B is a simplified flow chart of computer executable instructions for performing a method 510 on a processor having a software-controllable register map according to another embodiment of the present invention. The instructions can be stored on a computer-readable medium 512, such as magnetic disk, optical read-only memory ("ROM"), electronic ROM, randomly addressable memory ("RAM"), or a combination of types of memory. The instructions include a step of configuring a first register mapping array in the software-controllable register map 514, and configuring a second register mapping array in the software-controllable register map 518. In a particular embodiment, the first portion of the application includes privileged code. The first and/or second configuration of register map(s) may include modification of one or more register maps for alternate register namespaces, such as a floating-point registers. One mapping array can map an integer register namespace, and another mapping array can map a floating-point register namespace, for example, or multiple integer or floating-point namespaces can be mapped. In a further embodiment, the instructions include a step of executing a first portion of an application using the first mapping array 516, and, after the second register mapping array is defined, instructions for executing a second portion of the application 520. In some embodiments, an alternate register namespace is accessible from integer instructions in either the first portion of the application or the second portion of the application. The first and second mapping arrays can have blocks of registers with the same number or different numbers of registers in the respective blocks.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications, and variations as may fall within the spirit and scope of the following claims.

What is claimed is:

1. A processor comprising:
a central processing unit including
a logic processor;
a plurality of architectural registers; and
a software-controllable register map configured to map virtual registers accessed by software running on the logic processor to the plurality of architectural registers.

2. The processor of claim 1 wherein the software-controllable register map maps the virtual registers to the architectural registers according to an array defined by non-privileged software.

3. The processor of claim 1 wherein the software-controllable register map maps the virtual registers to the architectural registers according to an array defined by privileged software.

4. The processor of claim 3 wherein the privileged software is an operating system.

5. The processor of claim 1 wherein the register map is configured to map the virtual registers to the architectural registers to emulate a hardware-defined register mapping model.

6. The processor of claim 1 wherein the register map is configured to map the virtual registers into blocks of architectural registers, each block having $2^N$ registers, where N is an integer.

7. The processor of claim 1 wherein the register map is configured to map the virtual registers into blocks of architectural registers, at least one block having X registers where X does not equal $2^N$, N being an integer.

8. The processor of claim 1 wherein the register map includes a register rename map, the register rename map mapping architectural register numbers associated with the plurality of architectural registers to physical registers.

9. The processor of claim 8 wherein a physical register file includes a field that is not accessible by non-privileged software.

10. The processor of claim 9 wherein the field includes a register dirty bit.

11. The processor of claim 9 wherein the field includes a speculative-load exception bit.

12. The processor of claim 9 wherein the field includes a condition code bit.

13. The processor of claim 8 wherein the register rename map is not accessible to non-privileged software.

14. A processor comprising:

a central processing unit including a logic processor;

a registry having a plurality of physical registers;

a software-controllable register map configured to map virtual registers defined by non-privileged software running on the processor to architectural registers; and a register rename map disposed between the software-controllable register map and a physical register file array, the register rename map being unaccessible by the non-privileged software.

15. A method of operating a processor, the method comprising:

providing a processor with a software-controllable register map and architectural registers; and configuring the software-controllable register map to map virtual registers in code to be executed by the processor to a first plurality of architectural registers of the processor.

16. The method of claim 15 wherein the configuring step is done according to a register access model of a second processor.

17. The method of claim 15 further comprising a step of re-naming the first plurality of architectural registers to a first plurality of physical registers of the processor.

18. The method of claim 15 further comprising steps, after the executing step, of:

re-configuring the software-controllable register map to map the virtual registers to a second plurality of architectural registers; and executing second code on the processor.

19. A computer-readable medium having computer-executable instructions for performing the method of claim 15.

20. A computer-readable medium having computer-executable instructions for performing a method on a processor having a software-controllable register map comprising:

defining a first register mapping array in the software-controllable register map; and defining a second register mapping array in the software-controllable register map.

21. The computer-readable medium of claim 20 further comprising instructions for:

executing a first portion of an application using the first mapping array; and, after defining the second register mapping array;

executing a second portion of the application.

22. The computer-readable medium of claim 21 wherein the first portion of the application comprises privileged code.

23. The computer-readable medium of claim 21 wherein the first mapping array maps an alternate register namespace.

24. The computer-readable medium of claim 23 wherein the alternate register namespace comprises a floating-point register namespace.

25. The computer-readable medium of claim 23 wherein the alternate register namespace is accessible from integer instructions in either the first portion of the application of the second portion of the application.

26. The computer-readable medium of claim 20 wherein the first mapping array includes a first block having a first number of registers and the second mapping array includes a second block having a second number of registers, the first number of registers not equaling the second number of registers.

* * * * *